(12) United States Patent
Wallach

(10) Patent No.: US 11,861,690 B2
(45) Date of Patent: Jan. 2, 2024

(54) METHOD AND SYSTEM FOR TRANSFERRING FUNDS

(75) Inventor: Benjamin T. Wallach, Hoover, AL (US)

(73) Assignee: Regions Bank, Birmingham, AL (US)

( * ) Notice: Subject to any disclaimer, the term of this patent is extended or adjusted under 35 U.S.C. 154(b) by 620 days.

(21) Appl. No.: 12/437,205

(22) Filed: May 7, 2009

(65) Prior Publication Data
US 2009/0292603 A1 Nov. 26, 2009

Related U.S. Application Data

(60) Provisional application No. 61/054,607, filed on May 20, 2008.

(51) Int. Cl.
*G06Q 40/02* (2023.01)
*G06Q 20/10* (2012.01)
*G06Q 30/0207* (2023.01)

(52) U.S. Cl.
CPC .......... *G06Q 40/02* (2013.01); *G06Q 20/102* (2013.01); *G06Q 30/0215* (2013.01)

(58) Field of Classification Search
CPC ... G06Q 40/02; G06Q 20/102; G06Q 30/0215
USPC ...................................... 705/35, 38
See application file for complete search history.

(56) References Cited

U.S. PATENT DOCUMENTS

| | | | |
|---|---|---|---|
| 5,191,611 A * | 3/1993 | Lang | 705/53 |
| 5,812,668 A * | 9/1998 | Weber | 705/79 |
| 5,835,726 A * | 11/1998 | Shwed | H04L 9/3247 709/229 |
| 6,714,922 B1 * | 3/2004 | Sansone et al. | 705/406 |
| 7,225,155 B1 * | 5/2007 | Polk | 705/40 |
| 7,502,754 B2 * | 3/2009 | Campbell et al. | 705/35 |
| 7,523,057 B1 * | 4/2009 | Cornelius | 705/35 |
| 7,546,334 B2 * | 6/2009 | Redlich et al. | 709/201 |
| 7,734,546 B2 * | 6/2010 | Allin et al. | 705/40 |
| 7,783,566 B2 * | 8/2010 | Armes et al. | 705/40 |
| 7,792,748 B1 * | 9/2010 | Ebersole | G06Q 20/10 705/39 |
| 7,844,519 B2 * | 11/2010 | Wehunt et al. | 705/35 |
| 7,848,974 B1 * | 12/2010 | Sheehan | G06Q 20/102 705/35 |
| 2002/0046173 A1 * | 4/2002 | Kelly | 705/50 |
| 2002/0095651 A1 * | 7/2002 | Kumar et al. | 717/104 |
| 2002/0152175 A1 * | 10/2002 | Armstrong et al. | 705/64 |
| 2003/0097331 A1 * | 5/2003 | Cohen | G06Q 40/02 705/39 |
| 2003/0191711 A1 * | 10/2003 | Jamison | G06Q 20/04 705/40 |
| 2004/0088247 A1 * | 5/2004 | Grant | G06Q 20/10 705/38 |
| 2004/0088261 A1 * | 5/2004 | Moore et al. | 705/64 |

(Continued)

OTHER PUBLICATIONS

Online payment of bills with credit cards: where to start By Jeremy M. Simon Jun. 6, 2007.*

(Continued)

*Primary Examiner* — William E Rankins
(74) *Attorney, Agent, or Firm* — Honigman LLP

(57) ABSTRACT

A system and method of transferring funds includes a communication module configured to provide a user or automated process with an option of setting up an automatic fund transfer from a first payment channel to a second payment channel.

33 Claims, 3 Drawing Sheets

(56) References Cited

U.S. PATENT DOCUMENTS

| | | | |
|---|---|---|---|
| 2004/0111370 A1* | 6/2004 | Saylors et al. | 705/40 |
| 2004/0139014 A1* | 7/2004 | Song et al. | 705/40 |
| 2004/0215507 A1* | 10/2004 | Levitt et al. | 705/14 |
| 2004/0220875 A1* | 11/2004 | Kubitz | G06Q 20/10 705/39 |
| 2004/0254835 A1* | 12/2004 | Thomas | G06Q 20/10 705/14.18 |
| 2005/0086163 A1* | 4/2005 | Johnson et al. | 705/40 |
| 2005/0131813 A1* | 6/2005 | Gallagher et al. | 705/39 |
| 2005/0234820 A1* | 10/2005 | MacKouse | G06Q 30/04 705/40 |
| 2006/0020495 A1* | 1/2006 | Baker | G06Q 10/10 705/4 |
| 2006/0155641 A1* | 7/2006 | Postrel | 705/39 |
| 2006/0293952 A1 | 12/2006 | Nicholson et al. | |
| 2007/0100748 A1 | 5/2007 | Dheer et al. | |
| 2007/0136191 A1* | 6/2007 | Itwaru | G06Q 20/102 705/40 |
| 2008/0288351 A1* | 11/2008 | Leung et al. | 705/14 |
| 2010/0030687 A1* | 2/2010 | Panthaki et al. | 705/43 |

OTHER PUBLICATIONS

Credits and Debits on the Internet Marvin A. Sirbu Carnegie Mellon University (Year: 1997).*

Radha, R., et al., "Removal of redundant and irrelevant data from training datasets using speedy feature selection method." International Journal of Computer Science and Mobile Computing 5.7 (2016): 359-364.

* cited by examiner

METHOD AND SYSTEM FOR TRANSFERRING FUNDS

CROSS-REFERENCE TO RELATED APPLICATIONS

This application claims priority to U.S. Provisional Application No. 61/054,607 filed May 20, 2008, which is incorporated by reference in its entirety.

TECHNICAL FIELD

The invention relates to a system and method of transferring funds from one payment mechanism to another.

BACKGROUND

To implement automatic bill payment from a financial institution, users typically have the option to transfer funds from a checking account to an account of a payee, such as a utility company, either via paper or electronic channels. In contrast, users can visit a payee site directly and pay their bill with a credit or debit card. However, users have typically not been given the option to set up an automatic bill payment initiated through the financial institution such as a bank.

Financial institutions, themselves, have a difficult time trying to leverage card service technology via online banking bill payment even though doing so can improve efficiency, increase revenue, and reduce certain costs of doing business. Generally, financial institutions cannot initiate a payment on the card networks via online banking and realize the full extent of the revenue associated with such networks. Therefore, the payment must be delivered to the biller's site directly. Past methods and systems have not provided a process that leverage card service technology on behalf of the customer and the financial institution.

SUMMARY

In general, a system for transferring funds can include a communication module configured to provide a user or automated process with an option of setting up an automatic fund transfer from a first payment channel to a second payment channel and an implementation module configured to automatically transfer funds through the card service. The system can allow new or existing online bill payments to be converted to card transactions via single entry or mass conversion.

A system for transferring funds can include a communication module configured to provide a user or automated process with an option of setting up an automatic funds transfer from a first payment channel to a second payment channel through at least one access parameter and an implementation module configured to automatically transfer funds from a first payment channel to a second payment channel through the card service.

The first payment channel can include a user's checking account. The second payment channel can include a card service.

The card service can be created specifically for a first or second payment channel, or both. In some circumstances, the user can have an electronic payment account associated with a second payment channel. In such circumstances, the user can have an access parameter associated with a second payment channel.

In other circumstances, the user may not have an electronic payment account with a second payment channel. In situations where a user does not have an electronic payment account with a second payment channel, a financial institution such as a bank can set one up on behalf of the user, with the user's authorization. In such circumstances, an access parameter can be provided by a financial institution to the user. An access parameter can include security data or user identification data that permits access to each of the first payment channel or the second payment channel, individually.

The system for transferring funds can include a processor. The processor can direct or coordinate one or more modules. The system can include an implementation module configured to transfer funds independent of bill presentment. The implementation module can include software-coded instructions. The implementation module can also include hardware-coded instructions.

The system for transferring funds can include a filter module configured to transfer limited funds based on a predetermined amount set by the user. The fund transfer can be a bill payment. The fund transfer can be a recurring payment, such as a recurring bill payment. The communication module can be configured to provide an incentive for using a card service. A card service can include a debit card service using a debit card.

A method of transferring funds can include providing a user or automated process with an option of setting up an automatic fund transfer from a first payment channel to a second payment channel, providing an input module configured to receive an access parameter from an entity authorized to provide the access parameter, providing an implementation module configured to automatically transfer funds through the card service, and transferring funds automatically from the first payment channel to the second payment channel through an implementation module configured to automatically transfer funds through the card service.

A financial institution such as a bank can ask whether use has a preexisting electronic payment account with a biller. In some circumstances, the user may have an electronic payment account with a biller. In other circumstances, the user may not have an electronic payment account with a biller.

A method of transferring funds can further include an entity, such as a financial institution, acquiring the access parameter from the user with the user's authorization and logging in to a biller's website using the customer's access parameter.

The method of transferring funds can further include setting up a bill pay account. Transferring funds can include routing a bill payment automatically from a first payment channel to a second payment channel. The first payment channel can be a user's checking account. The second payment channel can be a debit card service.

A method of transferring funds can include storing funds in at least one initial storage location, providing a user or automated process with the option of automatic fund transfer from a first payment channel to a second payment channel, permissibly retrieving the funds from the initial storage location, supplying the funds to a separate account, and implementing the funds at the separate account.

The initial storage location can be a user's checking account. The separate account can be a biller's account. An entity, such as a financial institution can inquire whether a user has an electronic payment account with a biller. In some circumstances, the user may have an electronic payment account with a biller. An entity, such as a financial institution can acquire an access parameter from the user with the user's authorization and log in to a biller's website using the customer's access parameter.

In other circumstances, the user may not have an electronic payment account with a biller. An entity, such as a financial institution can set up a bill pay account on behalf of the customer. Transferring funds can include routing a bill payment automatically from a first payment channel to a second payment channel. A first payment channel can be a user's checking account. A second payment channel can be a debit card service.

The details of one or more embodiments are set forth in the accompanying drawings and in the descriptions below. Other features, objects, and advantages will be apparent from the drawings, from the descriptions, and from the claims.

DETAILED DESCRIPTION

Figure 1:
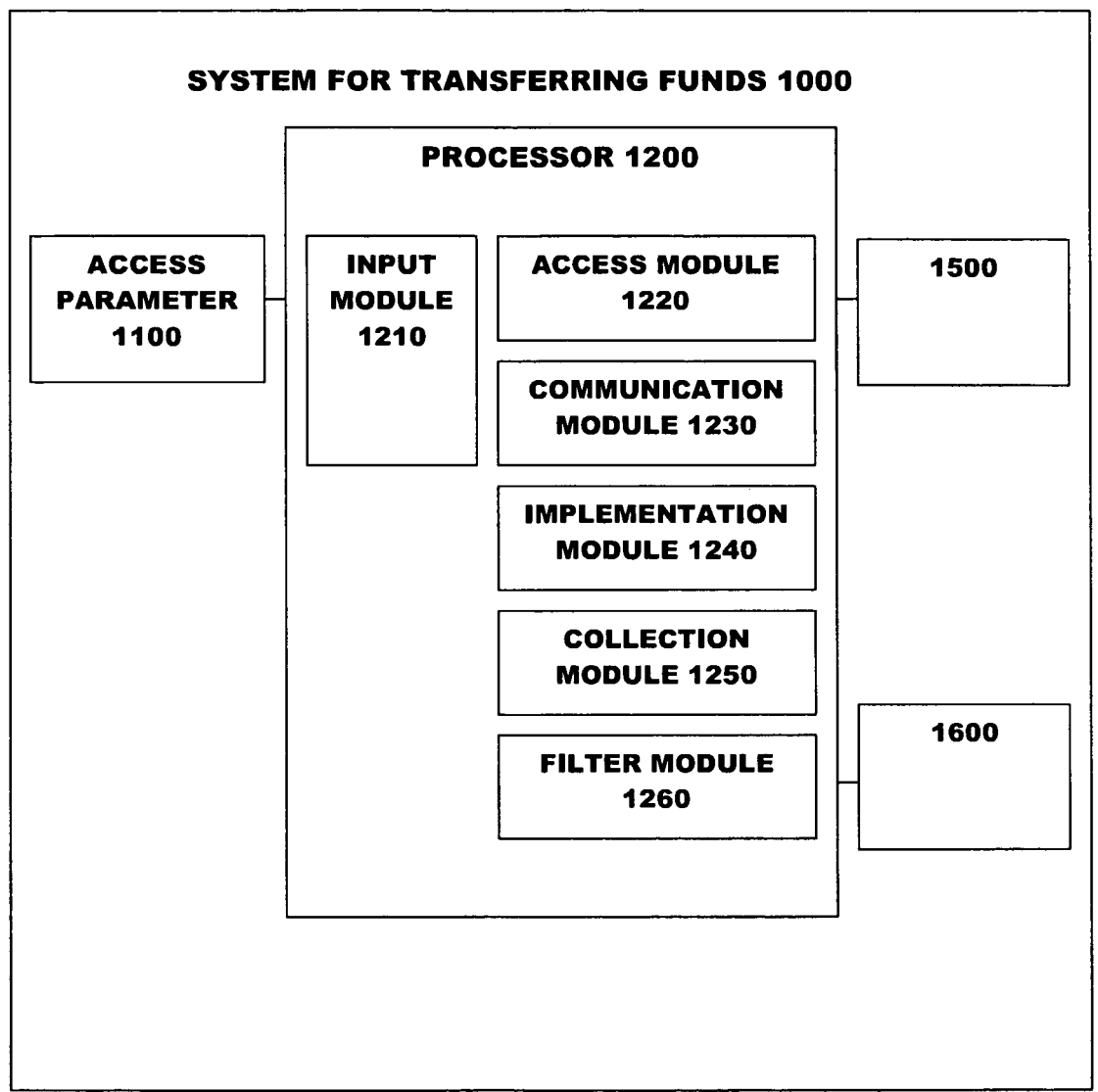
FIG. 1 is a drawing depicting a system of transferring funds.

Fund transfer associated with a card service can generate increased revenue for a financial institution, such as a bank. The systems and methods described herein can be used to transfer funds from one payment channel to another. A system for transferring funds can include a communication module configured to provide a user or automated process with an option of setting up an automatic fund transfer from a first payment channel to a second payment channel and an implementation module configured to automatically transfer funds through the card service that was originally created for a payment channel. Unlike other services, which only allow a user to pay through a card service upon bill presentment or a manual payment entry, a communication module can provide the user or automated process at the financial institution with a one-time or multi-time option of electing to pay through a card service by initiating the payment at the biller's site in an automated fashion. The card service can be used for a single fund transfer, multiple fund transfers, or recurring fund transfers.

In one example, a method of transferring funds can be a method of automatic bill payment. An entity, such as a financial institution or bank can provide a user, such as a customer, or automated process with an option for setting up automatic bill payment through a debit card service linked to the user's checking account. If the user decides to participate in automatic bill payment, the financial institution can inquire whether the customer has an existing electronic payment account with a biller, such as a utility company. If the user has an existing electronic payment account, the user can then provide the financial institution with an access parameter, such as a login and password. Upon receiving this information, the financial institution can access the biller's website and initiate payment on behalf of the customer. The financial institution can route the bill payment from the user's checking account to the debit card service. Once the user has provided the financial institution with an access parameter, the financial institution can initiate payment independent of bill presentment in single or recurring payments.

Alternatively, if the user or automated process wishes to participate in automatic bill payment through a debit card service, but does not have an existing electronic payment account with a certain biller, a financial institution can set up an electronic payment account for that particular biller on the user's behalf. Once the financial institution sets up the user's electronic payment account for that biller, the financial institution can provide the user with the access parameter such as the login or password for the user's records. The financial institution can access the biller's website and initiate bill payment on behalf of the customer. The financial institution can route the bill payment from the user's checking account to the debit card service.

Since bill payment through this method is independent of bill presentment, a user does not have to wait for bill presentment to ensure that a bill is timely paid. Additionally, the user doesn't have to take any action at all should the financial institution's automated process recognize the payment as a candidate for card processing. A financial institution can provide additional incentives for using automatic payment through a card service, such as reward points, cash awards, or improved interest rates for linked accounts. Bill payment can continue for a predetermined time period or indefinitely, until the user decides to end the service.

A method of transferring funds can include providing a user with an option of setting up an automatic fund transfer from a first payment channel to a second payment channel, providing an input module configured to receive an access parameter from an entity authorized to provide the access parameter, providing an implementation module configured to automatically transfer funds through the card service and transferring funds automatically from the first payment channel to the second payment channel through an implementation module configured to automatically transfer funds through the card service.

The fund transfer through a card service can be independent of bill presentment. For example, a user can transfer funds before a bill is presented. The user can also transfer funds whose value differ from (i.e. is more than or less than) the amount of a bill presented. When a user chooses to set up a fund transfer, such as an automatic bill payment, a financial institution, such as a bank can provide the user with the option to pay a certain predetermined amount through a card service, such as a debit card service. The user can also be given the option to combine payment with a card service with payment through another account, such as a checking or savings account.

A communication module is a module that can be configured to provide a user or automated process with an option of setting up an automatic fund transfer from a first payment channel to a second payment channel. A communication module can include a paper form, an electronic form, or natural persons or a computer executing instructions. A communication module can be configured to communicate, for example, by wired connection, wireless connection, verbally, or through written word.

An implementation module is a module that can be configured to automatically transfer funds from a first payment channel to a second payment channel through the card service. An implementation module can include software-coded or hardware-coded instructions, and configure funds to perform a function authorized by the owner of the funds or funds associated with the funds. The card service can be linked to a first payment channel, and configured to transfer funds to a second payment channel.

A method of transferring funds can include storing funds in at least one initial entity such as a bank, permissibly retrieving the funds through first payment channel, and supplying the funds to a second payment channel.

A computerized system of transferring funds can include an access parameter receiving fields, wherein at least one field provides an option for automatic card payment, an access module configured to electronically access the funds with the access parameter, and a processor configured to automatically transfer funds from the first payment channel to the second payment channel based on an access parameter.

For example, the funds corresponding to funds to be transferred can be stored electronically, magnetically, optically, on paper, or through any medium capable of holding data. The funds can be electronically stored using an optical storage medium, a magnetic storage medium, a temporary electronic storage medium such as random access memory (RAM), microcircuitry, and other electronic media. Examples of electronic media for storing funds are flash disk drives, magnetic disk drives, optical disk drives, magnetic tapes, and any surface into or upon which funds can be etched, or soldered. The funds can also be stored optically, for example, in holographic media. Non-electronic funds storage is a well known form of storage and includes such traditional devices as paper and human memory. It is not necessary for the funds to be confined to one storage location. A system and method for transferring funds can access one or more initial databases for transferring the funds to a second payment channel. A database can be electronic, such as a computerized server, or non-electronic such as printed on paper.

In some embodiments, a user's funds assists in the execution of one or more functions, for example, automatic bill payment. Such an embodiment can include a system or method of transferring a bank customer's account funds from a first payment channel to a second payment channel separately located, for example, at a second bank. While stored in the first payment channel and the first bank, the funds in this embodiment can be used for automatic bill payment. After permissibly accessing the first payment channel, system or method can then transfer the funds to the second payment channel at the second bank. The system and method in this embodiment can then implement automatic bill payment functionality, or other functionality, that utilizes the funds transferred. The function can be any task that includes the authorized use of the funds.

Authorization can take many forms and reflects the knowing consent and permission from the owner of the funds, either directly or through one or more surrogates acting on behalf of, or at the behest of, the owner of the funds. For example, authorization can be introduced to the systems and methods when an access parameter is permissibly introduced. In general, the funds contained in an first payment channel will require entry of one or more access parameters. This and other embodiments include an owner of funds that knowingly inputs or provides for input, an access parameter that can be used to authorize access to the owner's funds. After knowingly providing authorization, there exist embodiments that need not include any additional involvement from the owner of the funds. In an embodiment configured to transfer funds automatically, the burden on the owner of the funds throughout the funds transfer might only include providing an access parameter configured to provide access to the first payment channel. In such an embodiment, the bulk of the transfer can be automated, for example, through the use of computer or one or more natural persons. For example, a financial institution can have one or more personnel perform the transfer with or without the assistance of a computer. Accordingly, there are embodiments where both computers and natural persons are used to receive the access parameter and use the access parameter to transfer the funds from an first payment channel to a second payment channel.

Authorized access to the funds in the first payment channel can be ensured when the entity that owns the funds to be transferred provides the access parameters necessary for proper, safe, authorized access to the funds at the first payment channel. An access parameter can be provided by the owner of the funds, or an authorized surrogate for locating the correct funds at the first location. For example, an access parameter that is a user name will allow for the retrieval of the funds corresponding to the owner of the user name. The funds can be protected from unauthorized retrieval by any form of security technology. The owner of the funds, in possession of the parameters for accessing the funds in the initial storage location can also provide one or more access parameters that authorize the traversal of a security system guarding the funds stored in the first payment channel. Examples of access parameters that can traverse such security are a password that can be alphanumeric, fingerprint data, retinal data, biometric data such as DNA recognition, or any other funds capable of hindering unauthorized access to the funds.

The access parameters can be introduced through an input module. An input module can be anything capable of receiving the access parameter from the owner of the funds or the owner's authorized surrogate. An authorized surrogate can be a natural person, organization, device, or document, for example, a will. Examples of an input device are a keyboard, mouse, wired transmission, wireless transmission, or any medium capable of storing an access parameter for retrieval by an input module. In some embodiments, the input module can include properly configured ports, antennas, scanners, or other device configured to receive the access parameter.

Once the access parameter, or other form of authorization, is obtained and the funds in the first payment channel is accessible, there are certain circumstances where the funds can be implemented at the second payment channel to perform substantially the same function it performed at the first payment channel. There are other examples where the funds can perform a different function that performed at the first payment channel. In another example, it is not necessary for all of the funds to be transferred to the second payment channel. In such examples, a filter module can be used to sort the funds by separating unwanted funds from the funds that is desired to be stored at the second payment channel.

The funds can be implemented at the second location to perform an authorized function. For example, an authorized function can include the automatic payment of a banking customer's bills.

Referring to FIG. 1, in a system 1000, an access parameter 1100, or plurality of access parameters, can be provided to processor 1200 and received by input module 1210. In certain circumstances, processor 1200 can direct one or more modules for a more efficient transfer of funds. Processor 1200 can direct or coordinate interaction between one or more of input module 1210, access module 1220, communication module 1230, implementation module 1240, collection module 1250, and filter module 1260. Just as the system can include modules that are not reflected in FIG. 1, it is not required that all modules participate in the transfer of funds.

In an example that utilizes all modules shown in FIG. 1, an account owner can provide access parameter 1100 that can include, for example, a user name and a password. Access parameter 1100 is provided to input module 1210.

Input module 1210 is configured to receive access parameter 1100 and can then pass access parameters 1100 to access module 1220. Access module 1220 can then use access parameter 1100 to access first payment channel 1500. In this example, collection module 1250 can retrieve the funds from first payment channel 1500. If desired, filter module 1260 can ensure that only certain funds is communicated to second payment channel 1600 by and can be configured to separate the unwanted funds and block the unwanted funds from being transferred to second payment channel 1600. Communication module 1230 can be configured to transfer the funds to second payment channel 1600 and implementation module 1240 can configure the funds to perform a function authorized by the owner of the funds. Communication module 1230 can include paper or electronic forms, natural persons or a computer executing instructions and can be configured to communicated, for example, by wired connection, wireless connection, verbally, or through written word. Communication module can be configured to transfer funds independent of bill presentment. For example, a user can specify a predetermined amount, such as a dollar value or percent value, for a fund transfer before bill presentment. The fund transfer can be a recurring transfer, such as a recurring bill payment, or a monthly payment by installment of a loan, for example.

A user can set up the transfer to take place automatically, and the payments can vary depending on the user's specifications. For example, the user can elect to transfer a greater amount of funds every other month, or after the first five years. A user can also elect to transfer funds through a card service in combination with another account, such as a checking account.

In another example, the funds from first payment channel 1500 can be transferred once access module 1220 accesses first payment channel 1500 and processor 1200 instructs first payment channel 1500 to transfer the funds to second payment channel 1600 using communication module 1230. In this example, not every module in FIG. 1 is utilized.

Processor 1200 and each module, individually, can be a set of coded instructions. The coded instructions can be software-coded or hardware-coded. However, processor 1200 and each module, individually, are not limited to electronic execution of instructions. For example, processor 1200 and each module, individually, can also be instructions executed by natural persons. Consistent with the preceding example, processor 1200 can be an employee at a financial institution.

Figure 2:
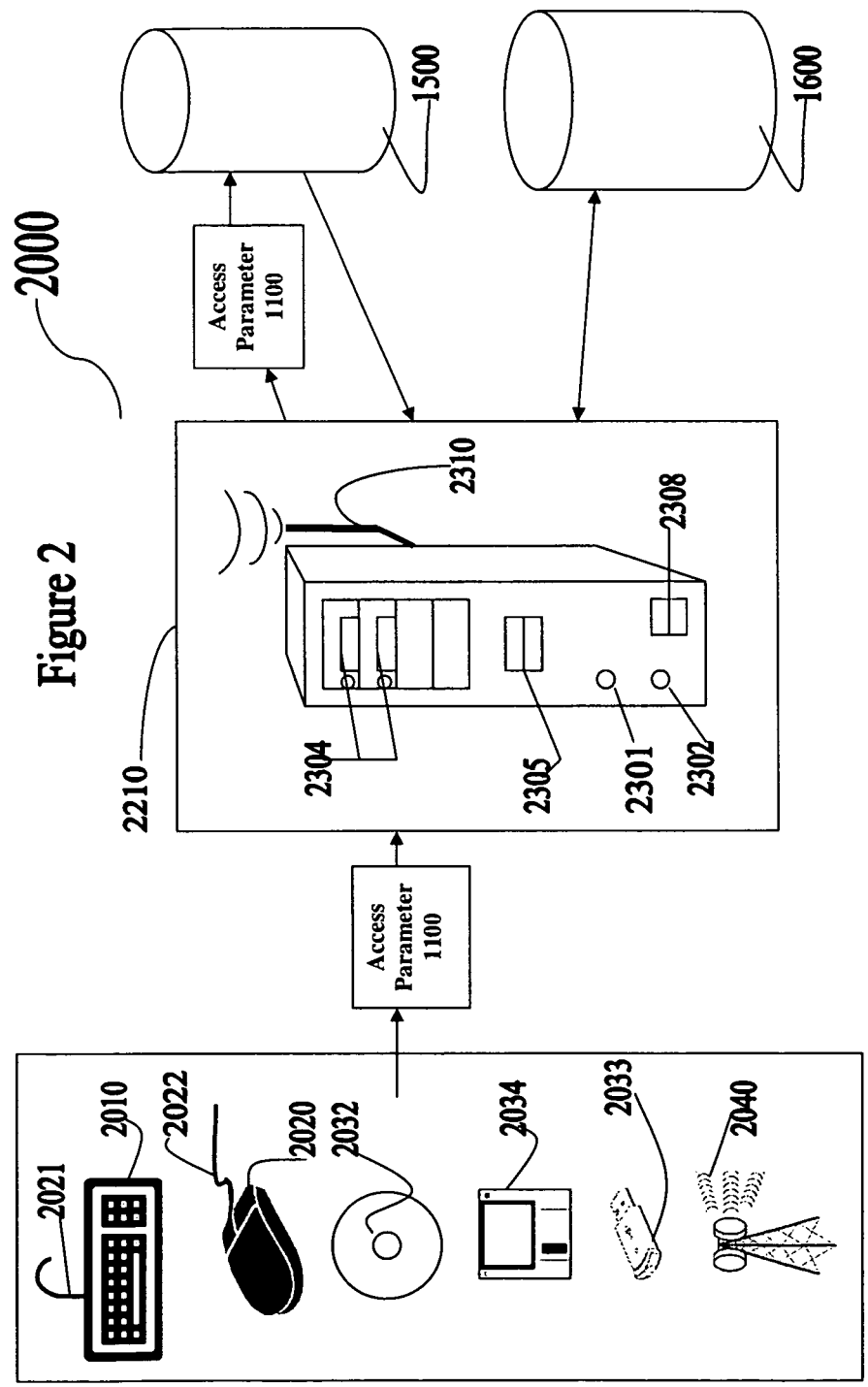
FIG. 2 is a drawing depicting examples of various components that can be used in a system of transferring funds.

Referring to FIG. 2, a system 2000 for transferring funds is depicted. System 2000 is an example of an embodiment where the processor is a computer 2210 configured to receive an access parameter from an input device. Keyboard 2010 is an example of an input device. Keyboard 2010 can be configured to transmit the access parameter to computer 2210 through a properly configured keyboard input port 2301 using a keyboard cable 2021 or by wireless transmission to receiving antenna 2310. Another example of an input device is mouse 2020. Mouse 2020 can be configured to transmit the access parameter to computer 2210 through a properly configured pointer input port 2302 using a mouse cable 2022 or by wireless transmission to receiving antenna 2310. The access parameter can also be electronically transferred to computer 2210 by other means. For example, electronic transfer can include transfer to computer 2210 from a storage device. Examples of storage devices can include optical media 2032, flash media 2033, and magnetic media 2034. Computer 2210 can receive the access parameter in many ways. For example, drive bay 2304 can be configured to receive input from optical storage media 2032 such as a Compact Disk or Digital Video Disk. In addition, drive bay 2305 can be configured to receive input from magnetic media 2034 such as a floppy disk. Serial port 2308 is another device through which computer 2210 can receive the access parameter. Serial port 2308 can be configured to receive input from, for example, flash storage media 2033. In general, however, an input device is any device configured to store the access parameter so that computer 2210 can receive the access parameter. For example, the data transfer can also be wireless, for example by use of a wireless transmitter 2040. Examples of a wireless transmitter include satellites, radio frequency emitters, Bluetooth emitters, cellular telephones, handheld computing devices, laptop computing devices, or any device capable of emitting a data-carrying signal configured to be received by antenna 2310. The access parameter can also be input vocally or through document scanning means.

Computer 2210 can then use the access parameter to access first payment channel 1100 and retrieve the funds. Computer 2210 can communicate with first payment channel 1500 and second payment channel 1600 through a wired connection or wirelessly. In an embodiment where the processor is an organization or instructions executed by natural persons, communication can also take place verbally or through written word.

The processor can also be a natural person. In general, the processor is any device, organization, natural person, or any other mechanism that is configured to accept input directly or indirectly and coordinate the execution of instructions either alone or in conjunction with one or more additional processors or one or more modules, to use an access parameter to gain access to a first payment channel and transfer funds from the first payment channel to a second payment channel. An example of a processor indirectly executing an instruction is by use of an input module to receive the access parameter. In other embodiments, the processor can use one or more modules, or even another processor.

Figure 3:
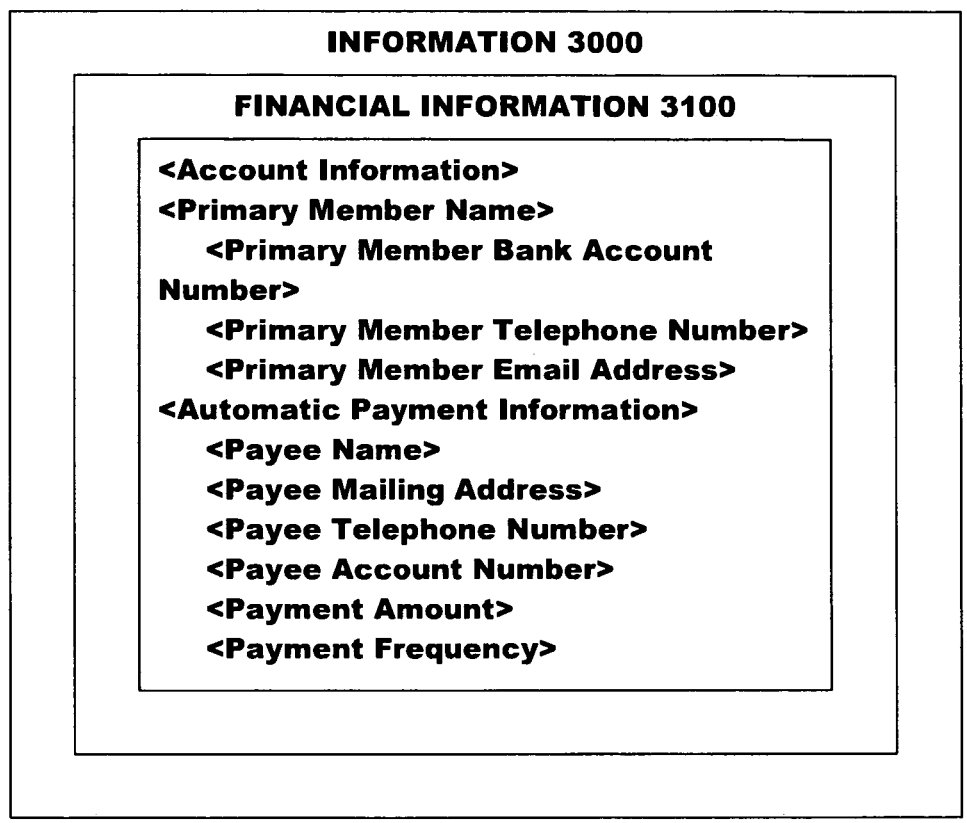
FIG. 3 is a drawing depicting examples of information associated with transferring funds.

Referring now to FIG. 3, information 3000 includes any information associated with funds that can be permissibly transferred from one location to a second location for authorized use at the second location. In one embodiment, information 3000 is transferred in a convenient manner. For example, an information transfer can lessen the involvement of the funds owner, or can even remove the owner's involvement altogether after the owner has provided a proper access parameter 1100. For example, FIG. 3 provides an example where information 3000 is includes the owner's card account information 3100 and some additional information that can assist in the automatic payment of the owner's bills. Other information can include the owner's primary member name, bank account number, telephone number, or E-mail address. In an example that includes the funds functioning to automatically pay the owner's bills, funds 3100 can also include the owner's automatic payment funds. For example, card account information 3100 can include payee name, payee mailing address, payee telephone number, payee account number, payment amount, or payment frequency.

A method of transferring funds can include providing an access parameter to an input module. The input module can then communicate the access parameter to one of several devices, including a processor or an access module. Funds or information associated with funds can be stored in a first payment channel. The access module can use the access parameter to access funds in a first payment channel. In some embodiments, the first payment channel can be accessed by without the utilizing the access module. In an example that includes the access module, the access module can retrieve the funds and transfer it to a second payment channel. This transfer can be done directly by the access module or indirectly through any combination of modules that results in the transfer of funds to the second payment channel so that the funds can be implemented to perform an authorized function, as described above. Some embodiments provide an implementation module configured to employ the funds to perform the authorized function.

Once the funds have been retrieved from the first payment channel, the funds can be subject to various forms of processing. Examples of such processing include collecting the funds through utilization of, for example, a collection module. The funds can be filtered by, for example, a filter module.

Filtering can include filtering based on data content. Data content filtering can, for example, remove data that is irrelevant to the functions to be performed after the funds are transferred to the second payment channel. Filtering can also include filtering by amount of funds, time of entry of fund transfer, location of fund transfer. For example, when the security of the funds is a concern, it can be desirable to retrieve the funds, filter all relevant, harmful data from transfer. For example, filtering can include determining which funds are sensitive and encrypting that information associated with funds for safe transfer.

In other embodiments, transfer of information is implemented so as to assist in the performance of a function while the funds are stored in a second payment channel. The funds can be implemented so as to perform substantially the same function it did prior to transfer. Implementing the funds can also include permissibly altering the function performed by the funds to a new authorized function. In addition, implementing the funds can include communicating the implementation instructions to the second payment channel. Communicating can be through the use of writing, wired connection, face-to-face communication, wireless communication, and any and all other known forms of conveying funds from one device, person, document, or organization to another device, person, document, or organization. Examples of wireless communication are radio frequency, infra-red, or other wave-length based forms of signal transfer such as Bluetooth transmission and detection, satellite transmission and detection, photonic transmission and detection, and any and all other known forms of wireless signal transmission and detection of signals configured to carry funds, for example, voice funds, data funds.

The method can also include increasing the efficiency of the funds transfer, for example, by utilizing a processor. Facilitating can include directing one or more modules to act in a certain way, or at a certain time, or only on certain funds. Facilitating can also include coordinating activity, or idle states, between a plurality of modules. Facilitating can be electronic, for example, facilitating can be computerized. Facilitating can also be non-electronic. Another example of a non-electronic processor is a natural person directing or coordinating the transferring, implementing, or other manipulating of the funds.

The embodiments described above are offered by way of illustration and example. It should be understood that the examples provided above may be altered in certain respects and still remain within the scope of the claims. For example, an embodiment of the system and method disclosed herein can fall within the scope of the claims even though the access parameter is neither funds-locating, such as a user name, nor security-traversing, such as a password. In an embodiment where the funds are inherently identifiable and no security protection is present, it is conceivable and, indeed, intended to be within the scope of the invention that in its broadest sense the access parameter can be a simple address, real or electronic, telephone number, or a single keystroke. Any access parameter used to retrieve the funds from the first funds storage location with authorization falls within the scope of the claims, such as the previously undisclosed embodiment just provided. It should be appreciated that, while the invention has been described with reference to the above preferred embodiments, other embodiments are within the scope of the claims.

What is claimed is:

1. A system for transferring funds based on a predetermined amount set by the user comprising:
    a processor that directs a communication module that electronically provides a user or automated process with an option of setting up an automatic transfer of funds from a first payment channel to a second payment channel through at least one access parameter and executing an instruction based on a function authorized by an owner of the funds or information associated with the funds;
    the access parameter comprising security data or user identification data that permits access to each of the first payment channel and the second payment channel, individually, and that locates information at a first database, wherein the information is stored electronically or magnetically on a medium capable of holding data including an optical storage medium, a magnetic storage medium, a temporary electronic storage medium, or microcircuitry;
    the access parameter being received from an entity including the owner of the information or one or more authorized surrogate, and the access parameter that traverses a security system guarding the information in the first database, and
    an implementation module that automatically transfers funds from a first payment channel to a second payment channel through the communication module, reflecting the consent and knowledge of the owner of the information the funds implemented to perform an authorized function after the funds are transferred to the second payment channel and that allows new or existing online bill payments to be converted to card transactions via single entry or mass conversion,
    an access module that accesses the first payment channel and processor and instructs the implementation module to transfer funds to the second payment channel,
    an input module, wherein the input module includes a device capable of receiving an access parameter for retrieval including wired transmission, or wireless transmission and receives the access parameter for retrieval, and
    a filter module that filters data based on a predetermined amount set by the user by determining which funds or data are associated with funds for safe transfer, encrypting information associated with funds for safe transfer, removing data that is unwanted and irrelevant to the authorized function, the authorized function performed after the funds are transferred to the second payment channel based on a predetermined amount set by the user when security of funds is a concern, and blocking unwanted and irrelevant data from being transferred to the second payment channel.

2. The system of claim 1 wherein the first payment channel includes a user's checking account.

3. The system of claim 1 wherein the second payment channel includes a card service.

4. The system of claim 3 wherein the card service is created specifically for a first or second payment channel.

5. The system of claim 1 wherein the user has an electronic payment account associated with a second payment channel.

6. The system of claim 1 wherein the user does not have an electronic payment account with a second payment channel.

7. The system of claim 1 wherein the access parameter is provided by a financial institution to the user.

8. The system of claim 1 further comprising a processor, wherein the processor comprises a set of coded instructions.

9. The system of claim 8 wherein the processor directs or coordinates one or more modules.

10. The system of claim 1 wherein the implementation module is configured to transfer funds independent of bill presentment.

11. The system of claim 1 wherein the implementation module includes software-coded instructions.

12. The system of claim 1 wherein the implementation module includes hardware-coded instructions.

13. The system of claim 1 wherein the filter module filters by amount of funds, time of entry of fund transfer, or location of fund transfer.

14. The system of claim 1 wherein the fund transfer is a bill payment.

15. The system of claim 1 wherein the fund transfer is a recurring payment.

16. The system of claim 1 wherein the communication module is configured to provide an incentive for using a debit card.

17. The system of claim 3 wherein the card service includes a debit card service.

18. A method of transferring funds based on a predetermined amount set by the user comprising:
providing a user or automated process with an option of setting up an automatic transfer of funds from a first payment channel to a second payment channel;
providing a processor that receives an access parameter from an input module from an entity authorized to provide the access parameter and executes an instruction based on a function authorized by an owner of the funds or associated with the funds;
the access parameter comprising security data or user identification data that permits access to each of the first payment channel and the second payment channel, individually, and that locates information at a first database, wherein the information is stored electronically or magnetically on a medium capable of holding data including an optical storage medium, a magnetic storage medium, a temporary electronic storage medium, or microcircuitry;
the access parameter associated with each of the first payment channel and the second payment channel and being received from an entity including an owner of the information or one or more authorized surrogate, and
the access parameter configured to traverse a security system guarding the information in the first database;
providing an implementation module that automatically transfers funds through a card service;
providing an access module that accesses the first payment channel and processor and instructs the implementation module to transfer funds to the second payment channel, and
transferring funds automatically from the first payment channel to the second payment channel through the communication module, reflecting the consent and knowledge of an owner of the information the authorized surrogate acting on behalf of or at the behest of the owner of the information, the funds implemented to perform an authorized function after the funds are transferred to the second payment channel,
allowing new or existing online bill payments to be converted to card transactions via single entry or mass conversion and
providing an input module, wherein the input module includes a device capable of receiving an access parameter for retrieval including a wired transmission, or wireless transmission and configured to receive the access parameter for retrieval, and
providing a filter module that filters data based on content by identifying which funds or data are associated with funds for safe transfer, encrypting information associated with funds for safe transfer, removing data that is unwanted and irrelevant to the authorized function, the authorized function performed after the funds are transferred to the second payment channel set by the user when security of funds is a concern, and blocking unwanted and irrelevant data from being transferred to the second payment channel.

19. The method of claim 18 wherein the user has an electronic payment account with a biller.

20. The method of claim 18 wherein the user does not have an electronic payment account with a biller.

21. The method of claim 20 further comprising setting up a bill pay account.

22. The method of claim 21 wherein transferring funds includes routing a bill payment automatically from a first payment channel to a second payment channel.

23. The method of claim 22 wherein the first payment channel is a checking account.

24. The method of claim 22 wherein the second payment channel is a debit card service.

25. A method of transferring funds based on a predetermined amount set by the user comprising:
storing funds in at least one initial storage location;
providing a user or automated process with the option of automatic fund transfer from a first payment channel to a second payment channel;
providing a processor that receives an access parameter from an input module, the access parameter comprising security data or user identification data that permits access to each of the first payment channel and the second payment channel, individually, and that locates information at a first database, wherein the information is stored electronically or magnetically on a medium capable of holding data including an optical storage medium, a magnetic storage medium, a temporary electronic storage medium, or microcircuitry;
the access parameter associated with each of the first payment channel and the second payment channel and being received from an entity including an owner of information or one or more authorized surrogate, the authorized surrogate acting on behalf of or at the behest of the owner of the information,
and
the access parameter that traverses a security system guarding the information in the first database;

providing an access module that accesses the first payment channel and processor and instructs the implementation module to transfer funds to the second payment channel, permissibly retrieving the funds from the initial storage location;

providing a filter module configured to filter data based on content by identifying which funds or data are associated with funds for safe transfer, encrypting information associated with funds for safe transfer, removing data that is unwanted and irrelevant to the authorized function the authorized function performed after the funds are transferred to the second payment channel set by the user when security of funds is a concern and blocking unwanted and irrelevant data from being transferred to the second payment channel;

separating an unwanted fund or data and blocking the unwanted fund or data from being transferred to the second payment channel such that only desired funds stored at the second payment channel;

determining which funds or data are associated with funds for safe transfer and encrypting the information associated with funds for safe transfer;

removing data that is unwanted and irrelevant to the authorized function;

supplying the funds to a separate account;

implementing the funds to perform an authorized function at the separate account; and allowing new or existing online bill payments to be converted to card transactions via single entry or mass conversion.

26. The method of claim 25 wherein the initial storage location is a user's checking account.

27. The method of claim 25 wherein the separate account is a biller's account.

28. The method of claim 25 wherein the user has an electronic payment account with a biller.

29. The method of claim 25 wherein the user does not have an electronic payment account with a biller.

30. The method of claim 29 further comprising setting up a bill pay account.

31. The method of claim 30 wherein transferring funds includes routing a bill payment automatically from a first payment channel to a second payment channel.

32. The method of claim 31 wherein the first payment channel is a checking account.

33. The method of claim 31 wherein the second payment channel is a debit card service.

* * * * *